J. A. STEFFENS.
PROCESS FOR MANUFACTURING ESTERS.
APPLICATION FILED APR. 5, 1921.
1,421,605.
Patented July 4, 1922.
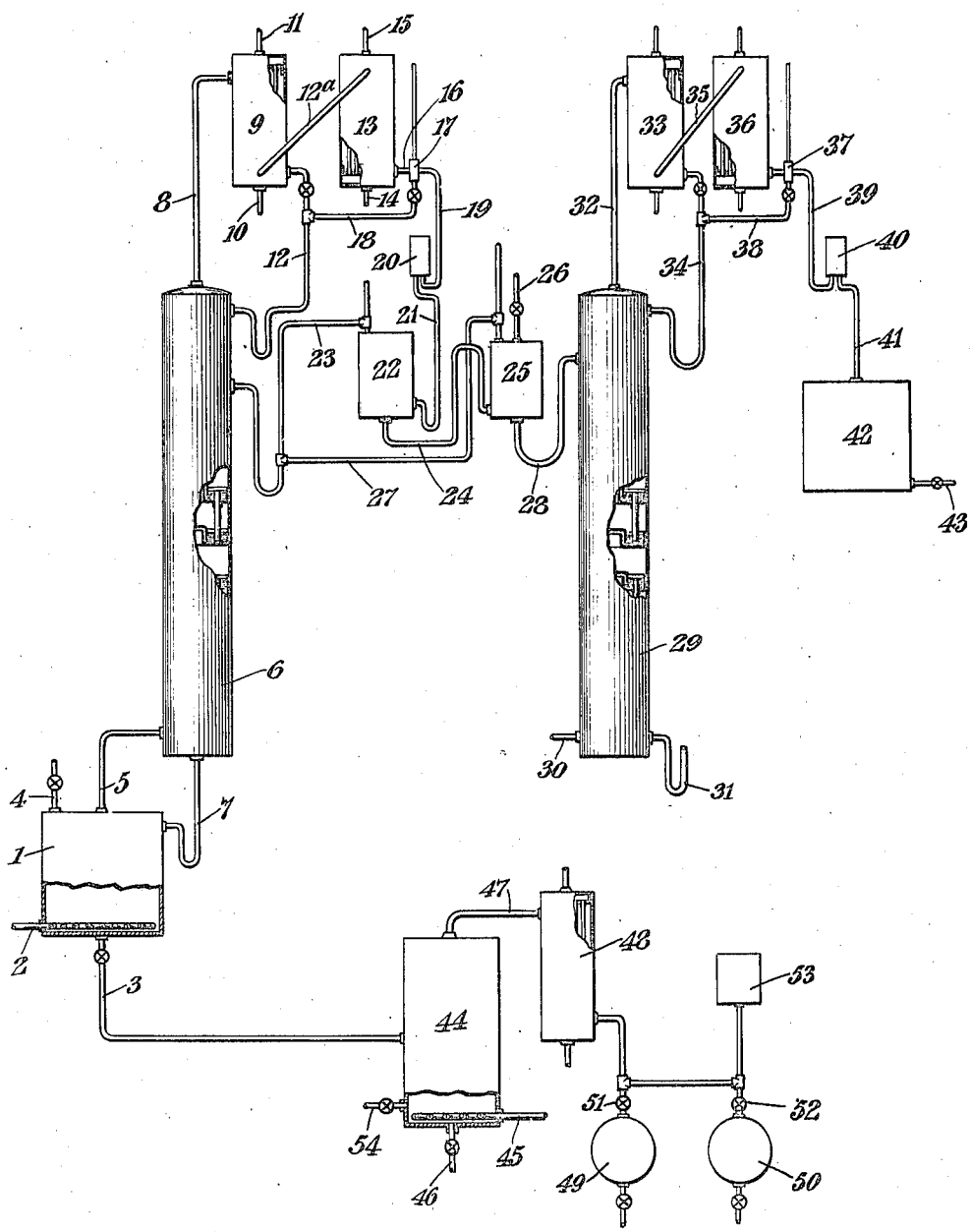

UNITED STATES PATENT OFFICE.

JOHN A. STEFFENS, OF BALTIMORE, MARYLAND, ASSIGNOR TO U. S. INDUSTRIAL ALCOHOL CO., A CORPORATION OF WEST VIRGINIA.

PROCESS FOR MANUFACTURING ESTERS.

1,421,605. Specification of Letters Patent. Patented July 4, 1922.

Application filed April 5, 1921. Serial No. 458,838.

*To all whom it may concern:*

Be it known that I, JOHN A. STEFFENS, a citizen of the United States, residing at Baltimore, State of Maryland, have invented certain new and useful Improvements in Processes for Manufacturing Esters, of which the following is a specification.

My invention relates particularly to a process designed for the production of esters on a commercial scale by removing the water formed, my invention having a special application to the production of esters with the aid of catalysts.

The object of my invention is to provide a process by means of which esters may be manufactured commercially with the aid of catalysts, the same being based upon the removal of the water formed in the esterification thus enabling the process to be conducted far enough to secure large yields.

More particularly the object of my invention is to provide a process involving the use of catalysts in which there is added to the alcohol and acid to be esterified a third liquid that is miscible with the alcohol but substantially immiscible with water, and which will enable vapors to be obtained containing a considerable percentage of water in addition to the alcohol and the third liquid. The vapors are evolved in the form of a ternary mixture of the three constituents. This third liquid may be any one of a number of different compounds such, for example, as benzol, toluol, carbon tetrachloride or hexane, but I prefer to use benzol.

One of the objects of my invention is to avoid the necessity of using a large amount of benzol in carrying out the process.

Again, another object of my invention, is to obtain a condensate rich in water while placing only a small load upon the auxiliary apparatus. A further object is to obtain a drier benzol owing to the separation of the condensate before introducing water into the same.

Further objects of my invention will appear from the detailed description thereof hereinafter.

While my invention is capable of being embodied in many different forms, for the purpose of illustration, I shall describe only certain ways of carrying out my invention, and while the same is capable of use with many different types of apparatus, I have shown only one type of apparatus for use therewith in the accompanying drawings, in which—

The figure is a diagrammatic representation of an apparatus which may be used in connection with my invention.

In the drawings, I have shown a still 1 heated by a steam coil 2 and provided with a valved drawoff pipe 3. The materials for the reaction are introduced through a valved pipe 4 which in case ethyl isovalerate is to be formed, are comprised of one chemical equivalent of isovaleric acid having a strength of 95%, two to three chemical equivalents of ethyl alcohol having a strength of 95%, or, if desired, absolute alcohol, together with an amount of benzol equal in volume to one-half the volume of the alcohol, and an amount of sulfuric acid having a strength of 66° Bé., equal to from two to three per cent of the total volume of the other constituents. These are distilled in the still 1 at a temperature of approximately 80° C. The isovaleric acid and alcohol react to form ethyl isovalerate with the liberation of water, and a mixture of water, benzol and alcohol vapors pass out of the still 1 by a pipe 5 to a column rectifier 6 from the lower end of which alcohol and benzol are returned by a liquid sealed pipe 7 to the still 1. From the top of the column 6 vapors containing 7% by weight of water, 74% by weight of benzol, and 19% by weight of alcohol pass off by a pipe 8 to a dephlegmator 9, cooled with a water current through inlet and outlet pipes 10 and 11, and from which some of the condensate passes back by a liquid sealed pipe 12 to the top of the column 6. Vapors from the dephlegmator 9 are conveyed by a pipe 12ª to a condenser 13 cooled with a water current supplied through inlet and outlet pipes 14 and 15, and from which the condensate passes by a pipe 16 to a vented sight-glass 17 arranged to convey part of the condensate by a pipe 18 back to the pipe 12 and thence to the column 6 where the remainder of the condensate is conducted by a pipe 19 to a tail-box 20. The condensate is now carried by a pipe 21 to a separating chamber 22 where it separates into two liquids, the upper layer of which contains 81% by weight of benzol, 15% by weight of alcohol and 4% by weight of water, the lower layer containing 35% by weight of water, 55% by weight of alcohol, and 10% by weight of benzol. The upper layer, comprised principally of benzol, is conveyed away by a vented liquid sealed overflow pipe 23 to the column 6 while the lower layer is conducted by a liquid sealed pipe 24 to the lower portion of a scrubber 25. In the scrubber water is added through a valved inlet pipe 26 to remove the remainder of the benzol which is conveyed back by a vented inlet pipe 27 to the pipe 23. The water layer from the scrubber then passes out of the same by a vented liquid sealed pipe 28 to a dilute alcohol column 29 provided with an inlet for steam 30 and an outlet for water 31 at the bottom of the column. The column 29 rectifies the alcohol received therein, the alcohol vapors passing up from the same by means of a pipe 32 to a dephlegmator 33, which has the usual water cooling system and a liquid sealed return pipe 34 to the top of the column 29. The vapors from the dephlegmator are conveyed by a pipe 35 to a condenser 36 cooled with the usual water cooling system, from which the condensate passes into a vented sight-glass 37 and from which part of the condensate passes by a pipe 38 back to the column through the pipe 34 while the remainder of the condensate is conveyed by a pipe 39 to a tail-box 40 having a discharge pipe 41 leading to a storage tank 42 provided with a valved draw-off pipe 43.

When the reaction is complete in the still 1 the ethyl isovalerate containing traces of alcohol and benzol passes out by the valved drawoff pipe 3 to a still 44 heated by means of a steam coil 45 and having a valved draw-off pipe 46 for conveying away the purified ethyl isovalerate. The vapors of alcohol and benzol pass out by pipe 47 to a condenser 48, cooled in the usual way with a current of water, from which the condensate is collected in one or more storage tanks 49 and 50 having valved inlet pipes 51 and 52 leading thereto. Connected to the pipe 52 there is also provided a vacuum pump 53 for securing the best available vacuum. Instead of the vacuum pump 53, however, I may use steam distillation in the still 44 by injecting live steam into the same through a valved inlet pipe 54. When the vacuum distillation is used the sulfuric acid will be collected from the still 44. If, however, steam distillation is used the sulfuric acid would be neutralized by the addition of calcium carbonate after the formation of the ester and before the distillation in the still 44, by introducing calcium carbonate either into the still 44 or the still 1.

In carrying out my process the isovaleric acid and the alcohol in the still 1 are heated to a temperature of approximately 80° C., thereby forming ethyl isovalerate while the water, benzol and alcohol pass into the column 6, from which vapors of water, benzol and alcohol are conveyed away for condensation, while alcohol and benzol are returned to the still 1 from the bottom of the column 6. The top of the column is continually sealed by a portion of the condensate from the dephlegmator 9 and the condenser 13, thus establishing, as far as possible, uniform conditions at the top of the column, as the top of the column is fed with a liquid very close in composition to the composition of the evolved vapors. This also enables the process to be conducted with a comparatively small quantity of benzol so that the condensate reaching the separating chamber 22 will be rich in the water to be removed. The remainder of the condensate is allowed to separate in the separating chamber 22 while the layer comprising principally benzol passes back into the column 6 without having been admixed with an additional quantity of water which will tend to make the benzol less dry and therefore less suited for carrying off the water from the column 6. The water layer from the separator passes into the scrubber 25 where it is subjected to washing with water in the proportions of approximately one part by weight of water to one part by weight of the incoming liquid, thus removing the remaining benzol which accumulates at the top of the scrubber and is conveyed back by the pipe 27 to the column 6. The remaining water layer comprising dilute alcohol is subjected to rectification in the column 29, the lower portion of which is maintained at approximately 100° C., from the lower end of which water flows away, while the evolved vapors of 95% alcohol are condensed and collected in the storage tank 42. In order to secure an ester free from traces of alcohol and benzol the ethyl isovalerate is subjected to vacuum distillation in the still 44 maintained at a boiling temperature so as to recover the separated ethyl isovalerate and mixed alcohol and benzol, which latter may be used over again in the process. In conducting the process with a vacuum distillation the sulfuric acid will be recovered from the still 4. If desired, however, instead of vacuum distillation steam distillation may be used in the still 44 and if steam distillation is used the sulfuric acid is neutralized with calcium carbonate or other neutralizing agent either in the still 1 or the still 44 before conducting the distillation in the latter still.

It will be understood that other esters may be made in accordance with my process as, for example, ethyl butyrate, ethyl valerate, ethyl propionate, ethyl benzoate, ethyl salicylate or ethyl acid sulfate, by esterification of the corresponding acids with ethyl alcohol. Furthermore, propyl alcohol or higher alcohols or polyatomic alcohols such as glycol or glycerol may be used instead of ethyl alcohol to produce the corresponding esters of any of these acids. Also, other catalysts may be used as, for example, hydrochloric acid, phosphoric acid, zinc chloride or sodium acid sulfate.

While I have described my invention in detail above many changes may be made in connection with the same within the scope of my invention.

I claim:

1. The process which comprises esterifying an alcohol and an acid with a catalyst in the presence of a third liquid, miscible with the alcohol but substantially immiscible with water, while removing from the reaction mixture vapors of water, the alcohol and the third liquid, rectifying said vapors and separating the condensate into two liquid layers without the addition of water, containing respectively high and low percentages of the third liquid.

2. The process which comprises esterifying an alcohol and an acid with a catalyst in the presence of a third liquid miscible with the alcohol but substantially immiscible with water, while removing from the reaction mixture vapors of water, the alcohol and the third liquid, rectifying said vapors, separating the condensate into two liquid layers without the addition of water, containing respectively high and low percentages of the third liquid, and subjecting the liquid layer containing the low percentage of the third liquid to washing to remove said third liquid therefrom.

3. The process which comprises esterifying an alcohol and an acid with a catalyst in the presence of a third liquid miscible with the alcohol but substantially immiscible with water, while removing from the reaction mixture vapors of water, the alcohol and the third liquid, rectifying said vapors and separating the condensate into two liquid layers, containing respectively high and low percentages of the third liquid and running back into the rectifier the third liquid which has been separated out.

4. The process which comprises esterifying an alcohol and an acid with a catalyst in the presence of a third liquid miscible with the alcohol but substantially immiscible with water, while removing from the reaction mixture vapors of water, the alcohol and the third liquid, rectifying said vapors, separating the condensate into two liquid layers, containing respectively high and low percentages of the third liquid, subjecting the liquid layer containing the low percentage of the third liquid to washing to remove said third liquid therefrom, and running back into the rectifier the third liquid which has been separated out.

5. The process which comprises esterifying ethyl alcohol and isovaleric acid with a catalyst in the presence of benzol, while removing from the reaction mixture vapors of water, the alcohol and the benzol, rectifying said vapors and separating the condensate into two liquid layers without the addition of water, containing respectively high and low percentages of the benzol.

6. The process which comprises esterifying ethyl alcohol and isovaleric acid with a catalyst in the presence of benzol while removing from the reaction mixture vapors of water, the alcohol and the benzol, rectifying said vapors, separating the condensate into two liquid layers without the addition of water, containing respectively high and low percentages of the benzol, and subjecting the liquid layer containing the low percentage of the benzol to washing to remove said benzol therefrom.

7. The process which comprises esterifying ethyl alcohol and isovaleric acid with a catalyst in the presence of benzol, while removing from the reaction mixture vapors of water, the alcohol and the benzol, rectifying said vapors and separating the condensate into two liquid layers, containing respectively high and low percentages of the benzol, and running back into the rectifier the benzol which has been separated out.

8. The process which comprises esterifying ethyl alcohol and isovaleric acid with a catalyst in the presence of benzol while removing from the reaction mixture vapors of water, the alcohol and the benzol rectifying said vapors, separating the condensate into two liquid layers, containing respectively high and low percentages of the benzol, subjecting the liquid layer containing the low percentage of the benzol to washing to remove said benzol therefrom, and running back into the rectifier the benzol which has been separated out.

9. The process which comprises esterifying an alcohol and an acid with a catalyst in the presence of a third liquid miscible with the alcohol but substantially immiscible with water, while removing from the reaction mixture vapors of water, the alcohol and the third liquid, rectifying said vapors and returning to the top of the rectifier some of the condensate.

10. The process which comprises esterifying an alcohol and an acid with a catalyst in the presence of a third liquid, miscible with the alcohol but substantially immiscible with water, while removing from the reaction mixture vapors of water, the alcohol and the third liquid, rectifying said vapors and returning to the top of the rectifier some of the condensate before separation of the same.

11. The process which comprises esterifying ethyl alcohol and isovaleric acid with a catalyst in the presence of benzol, while removing from the reaction mixture vapors of water, the alcohol and the benzol, rectifying said vapors and returning to the top of the rectifier some of the condensate.

12. The process which comprises esterifying ethyl alcohol and isovaleric acid with a catalyst in the presence of benzol while removing from the reaction mixture vapors of water, the alcohol and the benzol, rectifying said vapors and returning to the top of the rectifier some of the condensate before separation of the same.

13. The process which comprises esterifying an alcohol and an acid with a catalyst in the presence of a third liquid miscible with the alcohol but substantially immiscible with water, while removing from the reaction mixture vapors of water, the alcohol and the third liquid, rectifying said vapors and separating the condensate into two liquid layers, containing respectively high and low percentages of the third liquid, and rectifying the remaining liquid containing water and the alcohol.

14. The process which comprises esterifying an alcohol and an acid with a catalyst in the presence of a third liquid miscible with the alcohol but substantially immiscible with water, while removing from the reaction mixture vapors of water, the alcohol and the third liquid, rectifying said vapors, separating the condensate into two liquid layers, containing respectively high and low percentages of the third liquid, subjecting the liquid layer containing the low percentage of the third liquid to washing to remove said liquid therefrom, and rectifying the remaining liquid containing water and the alcohol.

15. The process which comprises esterifying an alcohol and isovaleric acid with a catalyst in the presence of benzol, while removing from the reaction mixture vapors of water, the alcohol and the benzol, rectifying said vapors and separating the condensate into two liquid layers, containing respectively high and low percentages of the benzol and rectifying the remaining liquid containing water and the alcohol.

16. The process which comprises esterifying ethyl alcohol and isovaleric acid with a catalyst in the presence of benzol, while removing from the reaction mixture vapors of water, the alcohol and the benzol, rectifying said vapors, separating the condensate into two liquid layers, containing respectively high and low percentages of the benzol, subjecting the liquid layer containing the low percentage of the benzol to washing to remove said benzol therefrom, and rectifying the remaining liquid containing water and the alcohol.

17. The process which comprises esterifying an alcohol and an acid with a catalyst in the presence of a third liquid miscible with the alcohol but substantially immiscible with water while removing from the reaction mixture vapors of water, the alcohol and the third liquid, and then distilling the resulting ester to remove the remaining alcohol and third liquid present therein.

18. The process which comprises esterifying an alcohol and an acid with a catalyst in the presence of a third liquid miscible with the alcohol but substantially immiscible with water while removing from the reaction mixture vapors of water, the alcohol and the third liquid, and then steam distilling the resulting ester to remove the remaining alcohol and third liquid present therein.

19. The process which comprises esterifying an alcohol and an acid with a catalyst in the presence of a third liquid miscible with the alcohol but substantially immiscible with water while removing from the reaction mixture vapors of water, the alcohol and the third liquid, and then steam distilling the resulting ester to remove the remaining alcohol, and third liquid present therein.

20. The process which comprises esterifying an alcohol and an acid with a catalyst in the presence of a third liquid miscible with the alcohol but substantially immiscible with water while removing from the reaction mixture vapors of water, the alcohol and the third liquid, and then steam distilling the resulting ester to remove the remaining alcohol and third liquid present therein, the catalyst having been first neutralized before distilling the ester formed.

21. The process which comprises esterifying an alcohol and an acid with a catalyst in the presence of a third liquid miscible with the alcohol but substantially immiscible with water while removing from the reaction mixture vapors of water, the alcohol and the third liquid, and then steam distilling the resulting ester to remove the remaining alcohol and third liquid present therein, the catalyst having been first neutralized with calcium carbonate before distilling the ester formed.

22. The process which comprises esterifying ethyl alcohol and isovaleric acid with a catalyst in the presence of a third liquid, miscible with the alcohol but substantially immiscible with water, while removing from the reaction mixture vapors of water, the alcohol and the third liquid, rectifying said vapors and separating the condensate into two liquid layers containing respectively high and low percentages of the third liquid.

23. The process which comprises esterifying an alcohol and an acid with a catalyst in the presence of a third liquid miscible with the alcohol but substantially immiscible with water, while removing from the reaction mixture vapors of water, the alcohol and the third liquid, rectifying said vapors and separating the condensate into two liquid layers, containing respectively high and low percentages of the third liquid separating out the third liquid from the layer containing a small percentage thereof and running back into the rectifier the third liquid which has been separated out.

24. The process which comprises esterifying an alcohol and an acid with a catalyst in the presence of a third liquid miscible with the alcohol but substantially immiscible with water, while removing from the reaction mixture vapors of water, the alcohol and the third liquid rectifying said vapors and separating the condensate into two liquid layers, containing respectively high and low percentages of the third liquid, separating out the third liquid from the layer containing a small percentage thereof, and rectifying the remaining liquid containing water and the alcohol.

25. The process which comprises esterifying ethyl alcohol and isovaleric acid with a catalyst in the presence of a third liquid miscible with the alcohol but substantially immiscible with water while removing from the reaction mixture vapors of water, the alcohol and the third liquid, and then distilling the resulting ester to remove the remaining alcohol and third liquid present therein.

In testimony that I claim the foregoing, I have hereunto set my hand this 19th day of March, 1921

JOHN A. STEFFENS.